(No Model.)
W. D. FORBES.
SCREW CUTTING DIE.
No. 253,996. Patented Feb. 21, 1882.
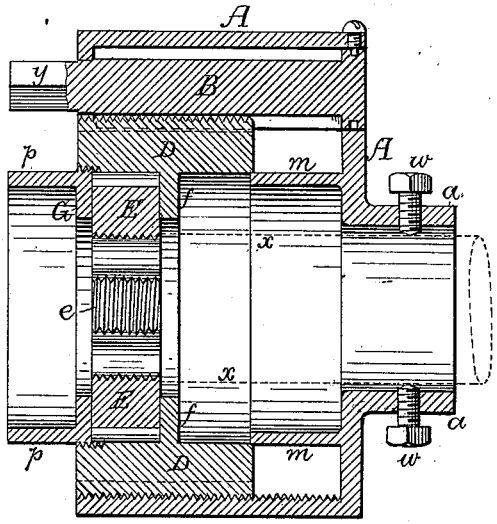
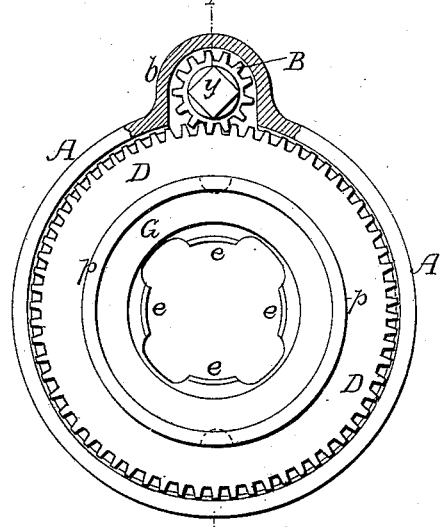
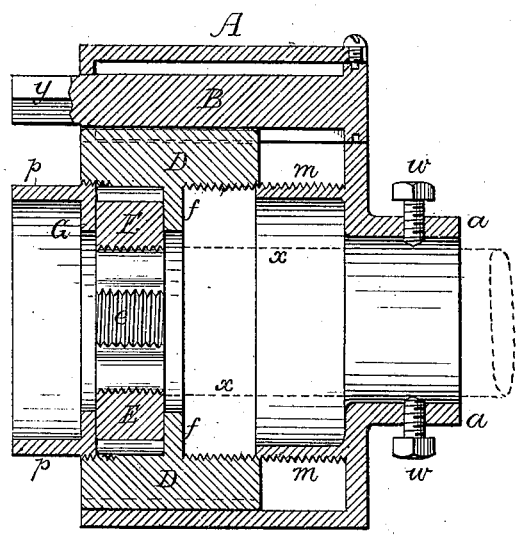
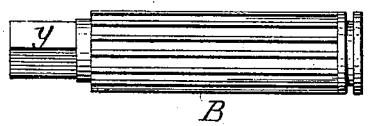
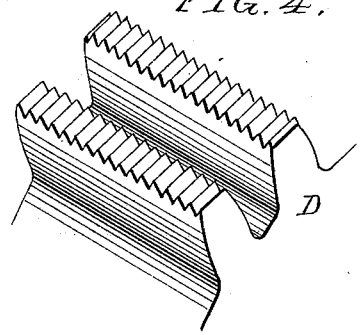
Witnesses
Harry Drury
Harry Smith
Inventor
William D. Forbes
by his Attorneys
Howson and Sons

UNITED STATES PATENT OFFICE.

WILLIAM D. FORBES, OF BRIDGEPORT, CONNECTICUT.

SCREW-CUTTING DIE.

SPECIFICATION forming part of Letters Patent No. 253,996, dated February 21, 1882.

Application filed November 14, 1881. (No model.)

*To all whom it may concern:*

Be it known that I, WILLIAM D. FORBES, a citizen of the United States, residing in Bridgeport, Connecticut, have invented certain Improvements in Die-Stocks, of which the following is a specification.

The object of my invention is to make a die-stock which can be used to advantage and with facility in cutting screw-threads on pipes of large diameter.

In the accompanying drawings, Figure 1 is a front view, partly in section, of my improved die-stock; Fig. 2, a longitudinal section on the line 1 2, Fig. 1; Fig. 3, a detached view of the elongated pinion; Fig. 4, an exaggerated perspective view of part of the teeth of the die-carrying ring, and Fig. 5 a section illustrating a modification of my invention.

In Figs. 1, 2, and 5, A is a cylindrical casing, provided with a hub, $a$, into which and into the casing is introduced the pipe $x$ to be threaded, as indicated by dotted lines in Fig. 2, the pipe being secured to the hub by set-screws $w$ or otherwise.

The die-carrying ring D is in the present instance threaded externally, and adapted to the internal screw-thread of the casing A, and has teeth on its periphery, as shown in Fig. 1, the screw-thread being cut into these teeth, as best observed in the edge view, Fig. 4. An elongated pinion, B, an external longitudinal view of which is shown in Fig. 3, having teeth adapted to those on the periphery of the ring D, is contained within a chamber in a projection, $b$, Fig. 1, of the casing A, the journals of the pinion having bearings in the ends of the said projection, as shown in Fig. 2, and one of the journals, $y$, extending beyond the casing for receiving a suitable handle.

The threading-die E, which may be made either in the form of a continuous ring with screw-cutting projections $e$, or in segmental sections, is held in the ring D by and between an internal flange, $f$, in the same, and a cap, G, which is screwed into the ring, the cap being serrated externally, so that it can be firmly grasped by the hands when it has to be screwed tight, or being otherwise prepared to receive a suitable instrument by which it can be easily turned. The die is prevented from turning in the ring by projections on one and recesses in the other, or by any other appropriate device.

It will be understood that the pitch of the screw-thread on the die-holding ring must necessarily be the same as that of the screw-cutting dies.

Supposing the pipe $x$ to have been introduced into the casing A and its hub $a$, as shown by dotted lines in Fig. 2, its end bearing against the die or dies E, the pinion B is turned so as to rotate the ring, and in rotating the ring must necessarily traverse the interior of the casing to an extent during each revolution determined by the pitch of the thread, the dies consequently cutting on the pipe $x$ a thread corresponding in pitch with that of the thread on the ring.

There is within the casing a hollow cylindrical projection, $m$, on which the die-holding ring D fits snugly, but so as to slide freely, this projection serving as a shield to prevent the metal cuttings due to the threading of the pipe from gaining access to the threaded interior of the casing as the die-carrying ring traverses within the same. In like manner the flange $p$ of the screw-cap G, as it overhangs the casing, prevents the cuttings from gaining access to the thread of the same, the shields in both cases preventing obstructions of the thread and permitting the die-carrying ring to freely enter and to be as freely withdrawn from the casing.

In the modification, Fig. 5, the die-carrying ring has teeth on its periphery; but, instead of cutting the screw-thread on the teeth, it is cut in the interior of the ring, a corresponding thread being cut on the cylindrical projection $m$. I however prefer the plan first described, as in Fig. 5 the cuttings from the pipe can gain access to the threaded interior of the ring.

My improved die-stock is well adapted to the threading of large pipes, such as are used for oil-wells, owing to the facility with which the die-carrying ring can be rotated by turning the elongated pinion. Another advantage is the operation of my improved die-stock without any necessity for griping the pipe in a vise or other retaining device, for the threading of the pipe may be accomplished while it is simply resting on any support which may be at hand.

I claim as my invention—

The combination, in die-stocks, of the following elements, namely: first, a casing, A, adapted to be secured to the object to be threaded; second, a threaded die-carrying ring having teeth on its periphery, and a screw-thread adapted to a corresponding thread in the casing; and, third, an elongated pinion having teeth adapted to those of the die-carrying ring, all substantially as set forth.

In testimony whereof I have signed my name to this specification in the presence of two subscribing witnesses.

WILLIAM D. FORBES.

Witnesses:
HARRY DRURY,
HARRY SMITH.